(12) United States Patent
Huang

(10) Patent No.: US 8,833,958 B2
(45) Date of Patent: Sep. 16, 2014

(54) DIRECT BACKLIGHT MODULE

(75) Inventor: Jianfa Huang, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 170 days.

(21) Appl. No.: 13/520,564

(22) PCT Filed: Apr. 18, 2012

(86) PCT No.: PCT/CN2012/074231
§ 371 (c)(1),
(2), (4) Date: Jul. 4, 2012

(87) PCT Pub. No.: WO2013/152521
PCT Pub. Date: Oct. 17, 2013

(65) Prior Publication Data
US 2013/0271956 A1    Oct. 17, 2013

(51) Int. Cl.
*G09F 13/04* (2006.01)
*G02F 1/1335* (2006.01)

(52) U.S. Cl.
CPC .......... *G02F 1/133608* (2013.01); *G09F 13/04* (2013.01)
USPC ......................................... 362/97.3; 362/97.1

(58) Field of Classification Search
CPC .............. G06F 13/04; G02F 1/133603; G02F 1/133608
USPC ....................................... 362/97.1, 97.2, 97.3
See application file for complete search history.

(56) References Cited

U.S. PATENT DOCUMENTS

| | | | |
|---|---|---|---|
| 8,052,295 B2 * | 11/2011 | Kim et al. ..................... | 362/97.3 |
| 2006/0232964 A1 * | 10/2006 | Hoshi et al. .................. | 362/231 |
| 2010/0284169 A1 * | 11/2010 | Bertram et al. .............. | 362/97.1 |

FOREIGN PATENT DOCUMENTS

| | | |
|---|---|---|
| CN | 101211054 A | 7/2008 |
| CN | 101358713 A | 2/2009 |
| CN | 201748290 U | 2/2011 |
| CN | 202074348 U | 12/2011 |

* cited by examiner

*Primary Examiner* — David V Bruce
(74) *Attorney, Agent, or Firm* — Cheng-Ju Chiang

(57) ABSTRACT

The present invention provides a direct backlight module including a backplane, backlight sources arranged inside the backplane, and a diffusion plate mounted to the backplane and located above the backlight sources. The backplane includes a bottom plate, side plates connected to the bottom plate, and mount units formed on the bottom plate and each having first and second slope surfaces that are inclined in opposite directions. The backlight sources are respectively mounted to the first and second slope surfaces, whereby the backlight sources are set inclined with respect to the diffusion plate in order to increase the distance available for light mixing, improve intensity and homogeneity of illumination, and at the same time reduce the quantity of LED lamps used to reduce the manufacture cost and facilitate size thinning of the backlight module.

9 Claims, 5 Drawing Sheets

DIRECT BACKLIGHT MODULE

BACKGROUND OF THE INVENTION

1. Field of the Invention

The present invention relates to the field of liquid crystal displaying, and in particular to a direct backlight module.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal panel and a backlight module. The working principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel.

Referring to FIG. 1, a conventional direct backlight module comprises a backplane 100, LED light bars 200 arranged inside the backplane 100, a reflector plate 300 arranged inside the backplane 100, a light guide plate 300 disposed on the bottom reflector plate 200, a diffusion plate 400 arranged above the reflector plate 300, an optic film assembly 500 disposed on the diffusion plate 400, and a plastic frame 600 mounted to the backplane 100. The LED light bars 200 supply lights that are mixed in a backlighting chamber 150 defined by the backplane 100 and the diffusion plate 400 and are subjected to homogenization by the diffusion plate 400 and the optic film assembly 500 so that the LED light bars 200 that are seemingly like spot light sources are converted to a planar light source.

However, the light exit surface 202 of each LED light bar 200 is set in parallel to a light incident surface 402 of the diffusion plate 400. This makes the available light mixing distance constrained by the thickness of the backlight module so that homogenization of planar lighting and size thinning cannot be achieved simultaneously.

SUMMARY OF THE INVENTION

Thus, an object of the present invention is to provide a direct backlight module that provides homogenous illumination and at the same time facilitates size thinning.

To achieve the object, the present invention provides a direct backlight module, which comprises a backplane, a plurality of backlight sources arranged inside the backplane, and a diffusion plate mounted to the backplane and located above the backlight sources, the backplane comprising a bottom plate, side plates connected to the bottom plate, and a plurality of mount units formed on the bottom plate. Each of the mount units comprises a first slope surface and a second slope surface that is inclined in a direction substantially opposite to the first slope surface. The backlight sources are respectively mounted to the first and second slope surfaces, whereby the backlight sources are set inclined with respect to the diffusion plate.

The mount units are integrally formed with the bottom plate.

The mount units are of an inverted V-shape, which is raised with respect to the bottom plate in a direction toward the diffusion plate.

Each of the mount units comprises a third slope surface that is connected to a side edge of the first slope surface that is distant from the second slope surface and a fourth slope surface that is connected to a side edge of the second slope surface that is distant from the first slope surface so that the mount unit shows a W-shape. The third and fourth slope surfaces are recessed with respect to the bottom plate in a direction away from the diffusion plate.

The first slope surface and the second slope surface are arranged symmetric with respect to each other.

The backlight sources comprise circuit boards and LED lamps mounted to and electrically connected to the circuit boards. The circuit boards are mounted to the first and second slope surfaces of the mount units.

The backlight sources further comprise LED lenses respectively mounted to the circuit boards. The LED lenses cover the LED lamps.

Aluminum extrusions are mounted between the circuit boards and the first and second slope surfaces of the mount units.

A reflector board is mounted on the bottom plate of the backplane. An optic film assembly is disposed on the diffusion plate. Lights emitting from the backlight sources are directly protected to or are reflected by the reflector board toward the diffusion plate, and then enter the optic film assembly.

The backlight sources comprise linear LED light bars.

The efficacy of the present invention is that the present invention provides a direct backlight module, which arranges mount units each comprising first and second slope surfaces on a bottom plate of a backplane to have backlight sources mounted to first and second slope surfaces of the mount units so that the backlight sources are set inclined with respect to the diffusion plate to thereby increase the distance available for light mixing, improve intensity and homogeneity of illumination, and at the same time reduce the quantity of LED lamps used to reduce the manufacture cost and facilitate size thinning of the backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
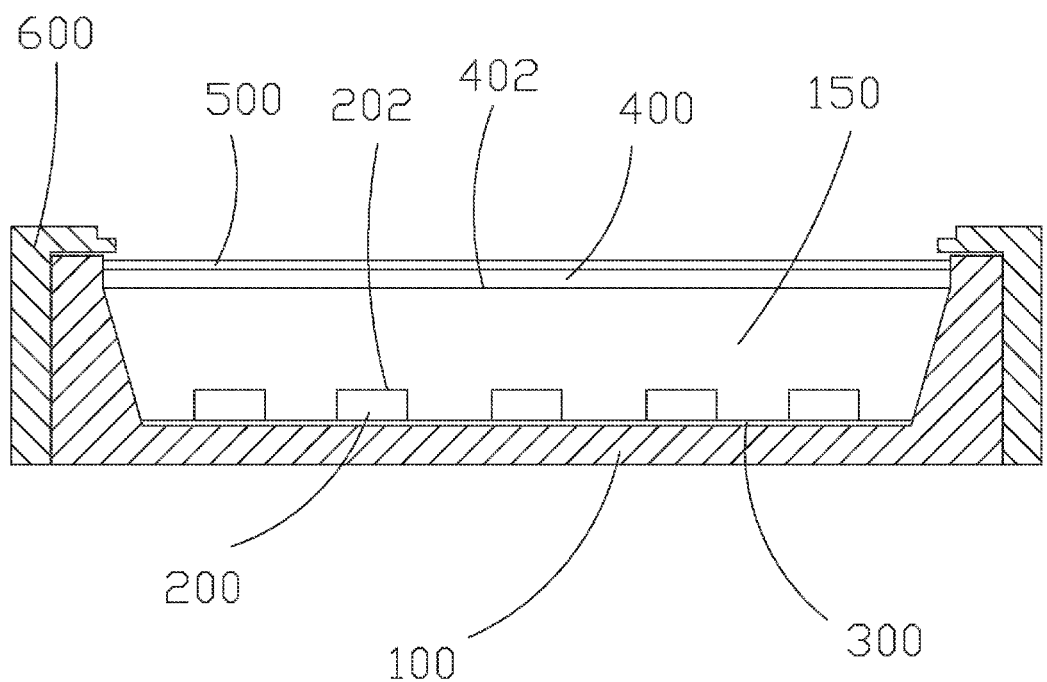
FIG. 1 is a schematic view showing the structure of a conventional direct backlight module.
Figure 2:
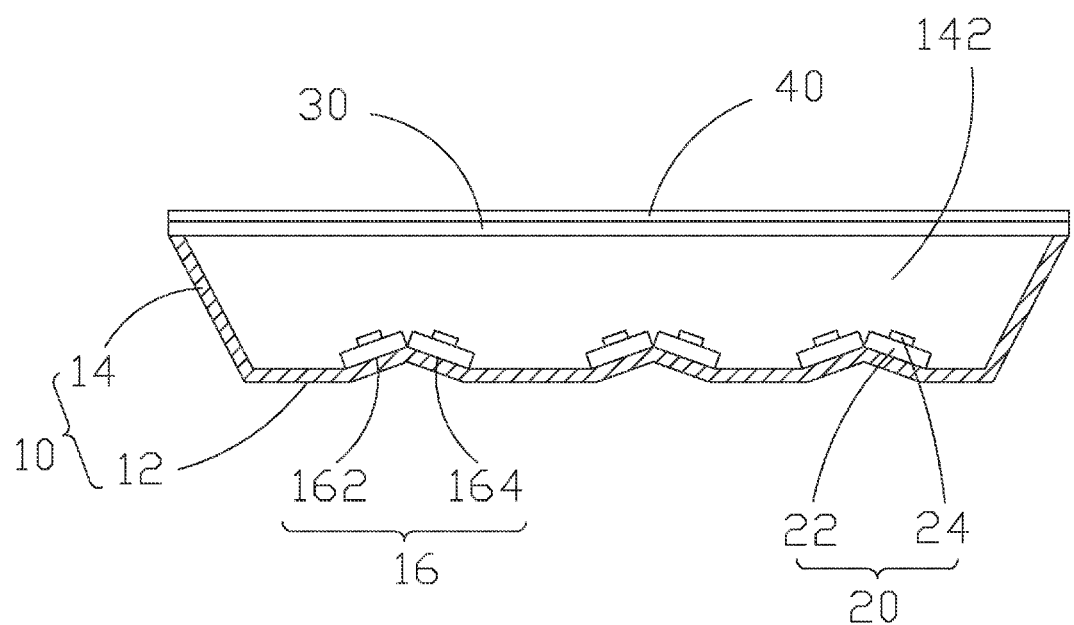
FIG. 2 is a schematic view showing the structure of a direct backlight module according to a first embodiment of the present invention.
Figure 3:
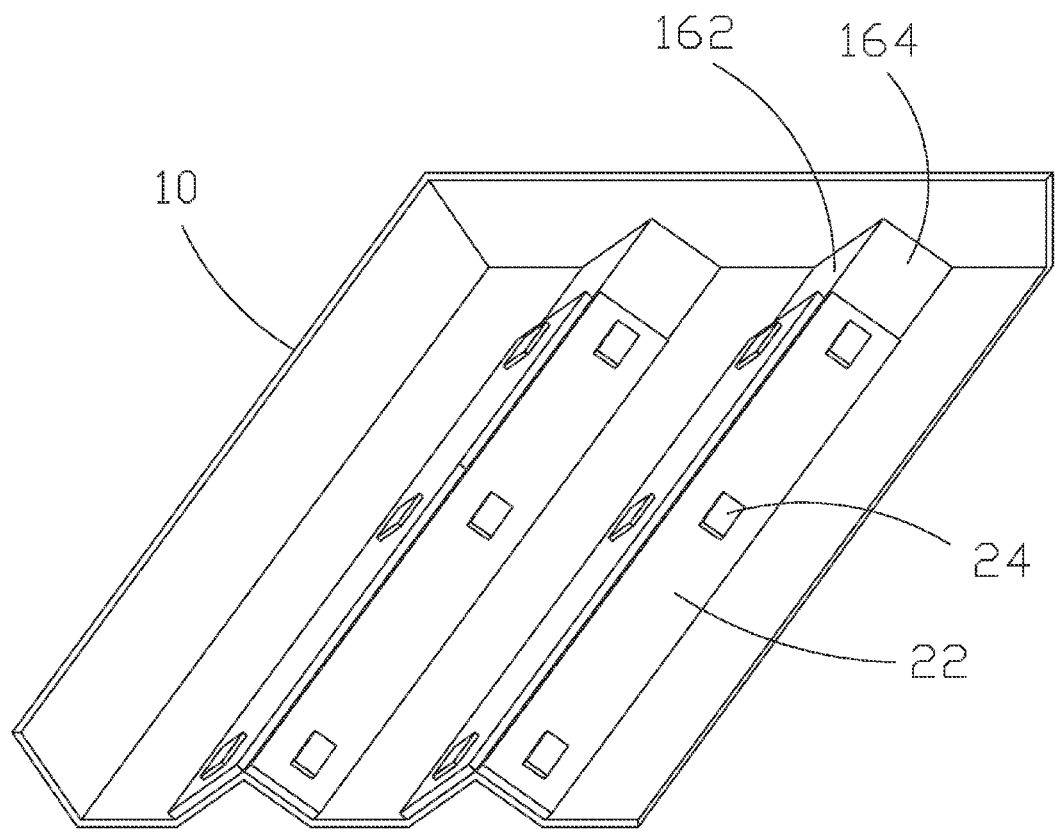
FIG. 3 is a perspective view showing assembled backlight sources and backplane shown in FIG. 2.

Referring to FIGS. 2 and 3, the present invention provides a direct backlight module, which comprises a backplane 10, a plurality of backlight sources 20 arranged inside the backplane 10, and a diffusion plate 30 mounted to the backplane 10 and located above the backlight sources 20, which collectively form the direct backlight module.

The backplane 10 comprises a bottom plate 12, side plates 14 connected to the bottom plate 12, and a plurality of mount units 16 formed on the bottom plate 12. The mount units 16 are integrally formed with the bottom plate 12. The bottom plate 12 and the side plates 14 collectively define a backlighting chamber 142.

Each of mount units 16 comprises a first slope surface 162 and a second slope surface 164 that is inclined in a direction substantially opposite to the first slope surface 162. The backlight sources 20 are respectively mounted to the first and second slope surfaces 162, 164, whereby the backlight sources 20 are set inclined with respect to the diffusion plate 30 so that lights emitting from the backlight sources 20 are projected, in an inclined manner, to the diffusion plate 30 and the distance that is available for the lights to mix in the backlighting chamber 142 is increased, allowing the light to homogenously mix.

Each of the backlight sources 20 comprises a circuit board 22 and a plurality of LED lamps 24 mounted to and electrically connected to the circuit board 22. The backlight source 20 is preferably an LED light bar. The circuit boards 22 are respectively mounted to the first and second slope surfaces 162, 164 of the mount units 16 and an aluminum extrusion (not shown) may selectively mounted between each circuit board 22 and the respective first or second slope surface 162, 164 to enhance heat conductivity therebetween.

In the instant embodiment, the first and second slope surfaces 162, 164 are connected to each other in such a way that the mount unit 16 shows an inverted V-shape that is raised, relative to the bottom plate 12, in a direction toward the diffusion plate 30. The first and second slope surfaces 162, 164 are preferably arranged symmetric with respect to each other and the circuit boards 22 of the backlight sources 20 are respectively mounted to the first and second slope surfaces 162, 164 to improve the overall intensity and homogeneity of illumination and at the same time reduce the quantity of LED lamps 24 used to thereby reduce the manufacture cost.

The backlight module further comprises a reflector board (not shown) mounted on the bottom plate 12 of the backplane 10 and an optic film assembly 40 disposed on the diffusion plate 30. Lights emitting from the backlight sources 20 are directly protected to or are reflected by the reflector board toward the diffusion plate 30, and then enter the optic film assembly 40 to provide homogenous planar lighting.

Figure 4:
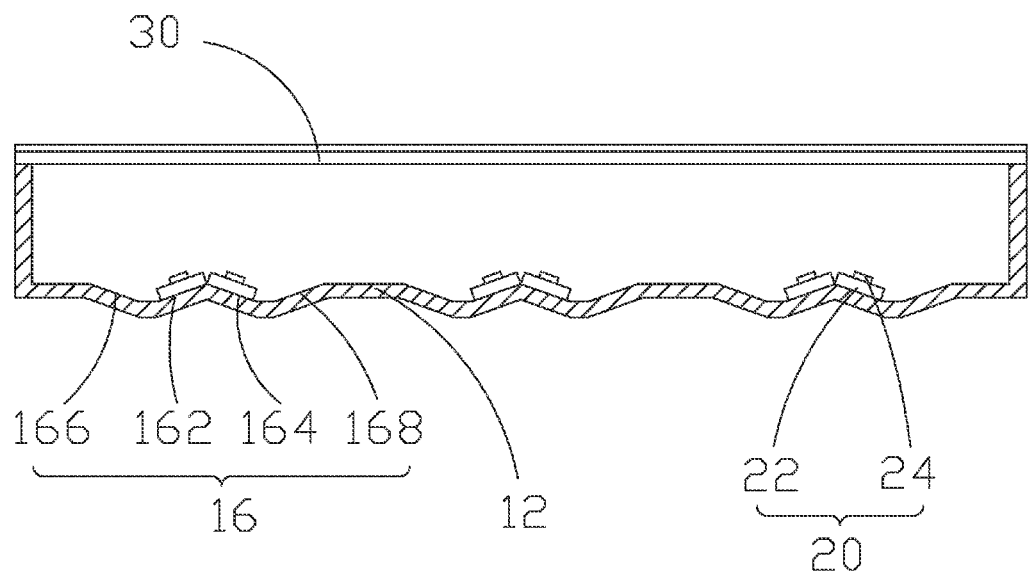
FIG. 4 is a schematic view showing the structure of a direct backlight module according to a second embodiment of the present invention.

Referring to FIG. 4, which is a schematic view showing the structure of direct backlight module according to a second embodiment of the present invention, in the instant embodiment, each of the mount units 16 further comprises a third slope surface 166 that is connected to the side edge of the first slope surface 162 that is distant from the second slope surface 164 and a fourth slope surface 168 that is connected to the side edge of the second slope surface 164 that is distant from the first slope surface 162 so that the mount unit 16 shows a W-shape. The third and fourth slope surfaces 166, 168 are recessed, relative to the bottom plate 12, in a direction away from the diffusion plate 30. The circuit boards 22 of the backlight sources 20 are respectively mounted to the first and second slope surfaces 162, 164 to improve the overall intensity and homogeneity of illumination and at the same time reduce the quantity of LED lamps 24 used to thereby reduce the manufacture cost.

Figure 5:
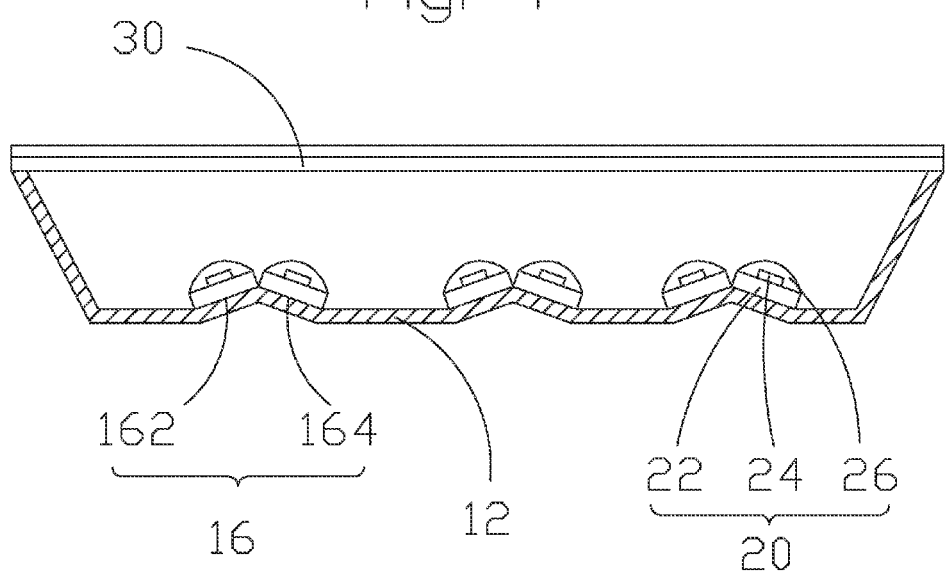
FIG. 5 is a schematic view showing the structure of a direct backlight module according to a third embodiment of the present invention.

Referring to FIG. 5, which is a schematic view showing the structure of direct backlight module according to a third embodiment of the present invention, the third embodiment provides improvement of the backlight sources 20 on the basis of the first embodiment. In the instant embodiment, each of the backlight sources 20 comprises a circuit board 22, a plurality of LED lamps 24 mounted to and electrically connected to the circuit board 22, and an LED lens 26 mounted to the circuit board 22. The LED lens 26 is arranged above and covers the LED lamps 24, so that lights emitting from the LED lamps 24 are refracted by the LED lens 26 to project in a bat-like manner thereby further improving homogeneity of light mixing, reducing the distance of light mixing, and facilitating size thinning of the backlight module.

Figure 6:
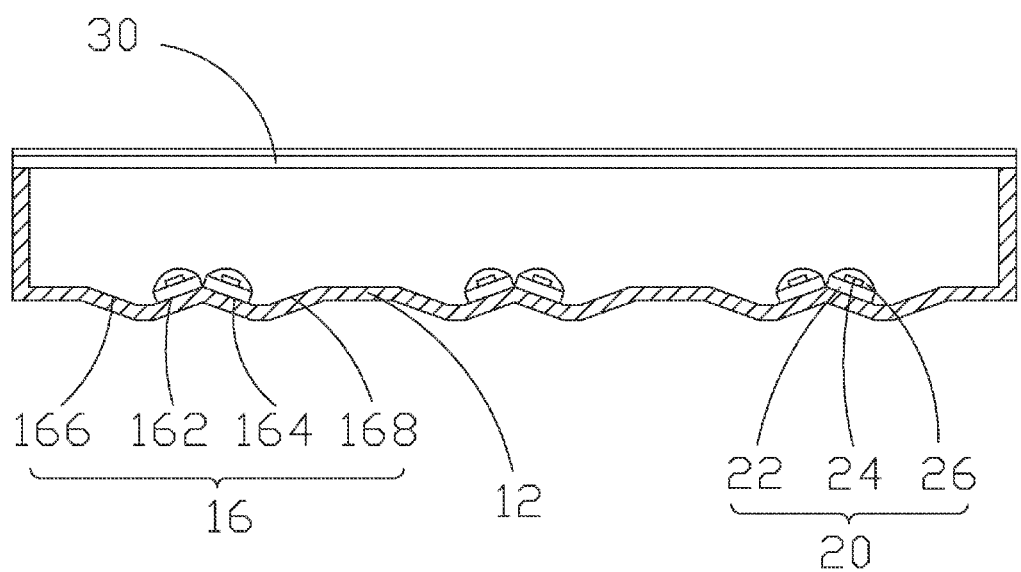
FIG. 6 is a schematic view showing the structure of a direct backlight module according to a fourth embodiment of the present invention.

Referring to FIG. 6, which is a schematic view showing the structure of direct backlight module according to a fourth embodiment of the present invention, the fourth embodiment provides improvement of the backlight sources 20 on the basis of the second embodiment. In the instant embodiment, each of the backlight sources 20 comprises a circuit board 22, a plurality of LED lamps 24 mounted to and electrically connected to the circuit board 22, and an LED lens 26 mounted to the circuit board 22. The LED lens 26 is arranged above and covers the LED lamps 24, so that lights emitting from the LED lamps 24 are refracted by the LED lens 26 to project in a bat-like manner thereby further improving homogeneity of light mixing, reducing the distance of light mixing, and facilitating size thinning of the backlight module.

In summary, the present invention provides a direct backlight module, which arranges mount units each comprising first and second slope surfaces on a bottom plate of a backplane to have backlight sources mounted to first and second slope surfaces of the mount units so that the backlight sources are set inclined with respect to the diffusion plate to thereby increase the distance available for light mixing, improve intensity and homogeneity of illumination, and at the same time reduce the quantity of LED lamps used to reduce the manufacture cost and facilitate size thinning of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A direct backlight module, comprising a backplane, a plurality of backlight sources arranged inside the backplane, and a diffusion plate mounted to the backplane and located above the backlight sources, the backplane comprising a bottom plate, side plates connected to the bottom plate, and a plurality of mount units formed on the bottom plate, each of the mount units comprising a first slope surface and a second slope surface that is inclined in a direction substantially opposite to the first slope surface, the backlight sources being respectively mounted to the first and second slope surfaces, whereby the backlight sources are set inclined with respect to the diffusion plate;

wherein each of the mount units further comprises a third slope surface that is connected to a side edge of the first slope surface that is distant from the second slope surface and a fourth slope surface that is connected to a side edge of the second slope surface that is distant from the first slope surface so that the mount unit shows a W-shape, the third and fourth slope surfaces being recessed with respect to the bottom plate in a direction away from the diffusion plate.

2. The direct backlight module as claimed in claim 1, wherein the mount units are integrally formed with the bottom plate.

3. The direct backlight module as claimed in claim 1, wherein the first slope surface and the second slope surface are arranged symmetric with respect to each other.

4. The direct backlight module as claimed in claim 1, wherein the backlight sources comprise circuit boards and light emitting diode (LED) lamps mounted to and electrically connected to the circuit boards, the circuit boards being mounted to the first and second slope surfaces of the mount units.

5. The direct backlight module as claimed in claim 4, wherein the backlight sources further comprise LED lenses respectively mounted to the circuit boards, the LED lenses covering the LED lamps.

6. The direct backlight module as claimed in claim 4, wherein aluminum extrusions are mounted between the circuit boards and the first and second slope surfaces of the mount units.

7. The direct backlight module as claimed in claim 1 further comprising a reflector board mounted on the bottom plate of the backplane and an optic film assembly disposed on the diffusion plate, whereby lights emitting from the backlight sources are directly protected to or are reflected by the reflector board toward the diffusion plate, and then enter the optic film assembly.

8. The direct backlight module as claimed in claim 4, wherein the backlight sources comprise linear LED light bars.

9. A direct backlight module, comprising a backplane, a plurality of backlight sources arranged inside the backplane, and a diffusion plate mounted to the backplane and located above the backlight sources, the backplane comprising a bottom plate, side plates connected to the bottom plate, and a plurality of mount units formed on the bottom plate, each of the mount units comprising a first slope surface and a second slope surface that is inclined in a direction substantially opposite to the first slope surface, the backlight sources being respectively mounted to the first and second slope surfaces, whereby the backlight sources are set inclined with respect to the diffusion plate;

wherein the mount units are integrally formed with the bottom plate;

wherein the first slope surface and the second slope surface are arranged symmetric with respect to each other;

the backlight sources comprising circuit boards and light emitting diode (LED lamps mounted to and electrically connected to the circuit boards, the circuit boards being mounted to the first and second slope surfaces of the mount units;

the backlight sources further comprising LED lenses respectively mounted to the circuit boards, the LED lenses covering the LED lamps;

wherein aluminum extrusions are mounted between the circuit boards and the first and second slope surfaces of the mount units;

a reflector board being mounted on the bottom plate of the backplane, an optic film assembly being disposed on the diffusion plate, lights emitting from the backlight sources being directly protected to or being reflected by the reflector board toward the diffusion plate, and then entering the optic film assembly; and wherein the backlight sources comprise linear LED light bars.

* * * * *